United States Patent
Hwang et al.

(10) Patent No.: US 9,745,452 B2
(45) Date of Patent: Aug. 29, 2017

(54) HIGH STRENGTH POLYMER FILAMENT FOR FDM 3D PRINTER INCLUDING GRAPHENE COATED METAL NANOPARTICLES, NANOCARBONS FOR 3D PRINTER, AND PREPARATION METHOD OF THE SAME

(71) Applicant: Korea Institute of Science and Technology, Seoul (KR)

(72) Inventors: Junyeon Hwang, Wanju-gun (KR); Seung Gyu Park, Wanju-gun (KR); Jin Seong Lim, Wanju-gun (KR); Wonjin Jo, Seoul (KR); Heon Ju Lee, Seoul (KR); Myoung-Woon Moon, Seoul (KR); Bon-Cheol Ku, Wanju-gun (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/099,114

(22) Filed: Apr. 14, 2016

(65) Prior Publication Data
US 2017/0130034 A1 May 11, 2017

(30) Foreign Application Priority Data
Nov. 10, 2015 (KR) .......................... 10-2015-0157193

(51) Int. Cl.
C08K 9/00 (2006.01)
C08K 9/10 (2006.01)
B29C 47/00 (2006.01)

(52) U.S. Cl.
CPC ............ *C08K 9/10* (2013.01); *B29C 47/0014* (2013.01)

(58) Field of Classification Search
CPC .................................. C08J 3/20; D01F 9/225
See application file for complete search history.

(56) References Cited

U.S. PATENT DOCUMENTS

2014/0134334 A1* 5/2014 Pridoehl ................ B05D 1/265
427/256

FOREIGN PATENT DOCUMENTS

KR 10-2014-0125033 A 10/2014
KR 10-1532026 B1 6/2015

OTHER PUBLICATIONS

Luechinger, Norman A., et al. "Graphene-stabilized copper nanoparticles as an air-stable substitute for silver and gold in low-cost ink-jet printable electronics." Nanotechnology 19.44, 2008, 445201 (7 pages).
Antar, Zied, et al. "Thermoelectric behaviour of melt processed carbon nanotube/graphite/poly(lactic acid) conductive biopolymer nanocomposites (CPC)." Materials Letters 67.1, 2012, 210-214.
Lee, M.G., et al., "Development of High Strength CNT Reinforced PLA Filament for FDM 3D Printer", The Journal of the Korean Society of Manufacturing Technology Engineers Conference, Sep. 2014 (3 pages).
Korean Office Action issued Dec. 19, 2016 in counterpart Korean Patent Application No. 10-2015-0157193 (5 pages in Korean).

* cited by examiner

*Primary Examiner* — Hannah Pak
(74) *Attorney, Agent, or Firm* — NSIP Law

(57) ABSTRACT

The present invention relates to a 3D printer polymer filament improving strength of a polymer resin and providing durability by using graphene coated metal nanoparticles and carbon nanotubes, and expressing a function of the graphene coated metal nanoparticles and the carbon nanotubes as a filler, and a manufacturing method thereof. Accordingly, according to the present invention, the 3D printer polymer filament and the manufacturing method includes mixing the graphene coated metal nanoparticles, the carbon nanotubes, and the polymer, using the manufactured mixture to form a filament through extrusion, and forming a 3D printed article by using the filament, thereby improving the strength and the durability by using the graphene coated metal nanoparticles and the carbon nanotubes.

8 Claims, 8 Drawing Sheets

HIGH STRENGTH POLYMER FILAMENT FOR FDM 3D PRINTER INCLUDING GRAPHENE COATED METAL NANOPARTICLES, NANOCARBONS FOR 3D PRINTER, AND PREPARATION METHOD OF THE SAME

CROSS-REFERENCE TO RELATED APPLICATION

This application claims priority to and the benefit of Korean Patent Application No. 10-2015-0157193 filed in the Korean Intellectual Property Office on Nov. 10, 2015, the entire contents of which are incorporated herein by reference.

BACKGROUND OF THE INVENTION (a) Field of the Invention

The present invention relates to a high strength composite material using nanocarbons and metal nanoparticles coated with graphenes. More particularly, the present invention relates to a high strength polymer filament for a 3D printer for an FDM-type realizing a function of the metal nanoparticles coated with the graphenes and the carbon nanotubes, and improving the strength and durability of the polymer, and a manufacturing method thereof, by dispersing the nanocarbons and the metal nanoparticles coated with the graphenes in a biocompatibility polymer resin.

(b) Description of the Related Art

Recently, due to technology development including 3D printing material development and economic availability, a 3D printer capable of molding a three-dimensional object is being used in a variety of industry fields, and receptivity of the technology thereof is increasing. The 3D printing is a method of molding a product by transmitting a 3D design drawing of a computer to the 3D printer, and in the product molding method of the 3D printer, there are a method (fused deposition modeling; FDM) in which a raw material such as a resin is melted and then compressed through a nozzle to stack a thin hardened layer, a method (selective laser sintering; SLS) in which the raw material is heated by a laser to be sintered, and a method (stereo lithography apparatus; SLA) in which a laser is projected in a tank containing a photo-curable resin to be cured.

Among these methods, the 3D printer of the method (FDM type) of melting and stacking the filament has a simple structure of the apparatus and a simple program, and a low manufacturing cost compared with the other 3D printers, and for this reason, the 3D printer of the FDM type using the filament is advantageous for a large size and can be applied to various industrial fields, thereby trending to be popular in the home and industry.

Currently, plastic materials most widely used as the filament material that is the material of the FDM-type printer are acrylonitrile butadiene styrene (ABS) and polylactic acid (PLA), and among them, the ABS is inexpensive and has a good durability, however there is a drawback that it requires a high temperature of about 220° C. during processing and a heating bed to prevent shrinkage when outputting. On the other hand, the PLA is biodegradable and environmentally-friendly, and has easier output than the ABS, thereby getting a lot of the limelight, however the strength and the durability are poor and the conductivity is low such that use thereof in various fields such as for electrical and electronic components and for biotechnology is limited.

As a method to improve the strength of the polymer resin such as the PLA, a ceramic, a graphene, a carbon nanotube, or the like is added to form the filament, however dispersion thereof is not easy in the polymer such that there are drawbacks that the strength is rather weak or the strength does not increase beyond a certain level. Particularly, due to metal particles having different physical and chemical characteristics from the polymer base, aggregation is easily generated in the polymer base such that a function as the filler is limited.

On the other hand, studies on nanocarbon filaments have been performed as follows. [M. G. Lee, et al., Journal of the Korean Society of Manufacturing Technology Engineers Conference, September 2014, 31-31] is 3D printer PLA filament research only using the carbon nanotubes as a reinforcing agent. Also, [Wendelin J Stark et al., 2008 Nanotechnology 19 445201] is research related to inkjet printing using Cu nanoparticles with a graphene coating, and [Z. Antar et al., Materials Letters 67, 2012, 210-214] as research related to a composite using carbon nanotubes does not disclose the 3D printer filament.

Accordingly, the 3D printer filament technique including the nanoparticles with the graphene coating and with remarkably improved strength has not been known up to now, and the development thereof is urgent.

The above information disclosed in this Background section is only for enhancement of understanding of the background of the invention and therefore it may contain information that does not form the prior art that is already known in this country to a person of ordinary skill in the art.

SUMMARY OF THE INVENTION

Accordingly, the present invention provides a 3D printer polymer filament realizing a function of metal nanoparticles coated with the graphenes and the carbon nanotubes, and improving the strength of the polymer by uniformly dispersing the metal nanoparticles coated with the graphenes and the carbon nanotubes as the filler in the polymer resin with an appropriate ratio.

The objects to be solved in the present invention are not limited to the above-mentioned objects, and other non-mentioned objects can be clearly understood to those skilled in the art from the following description.

In an aspect of the present invention, a composite material including graphene coated metal nanoparticles at 1 wt % to 20 wt %, nanocarbons at 10 wt % or less, and a polymer resin at 70 wt % to 99 wt % is provided. By adding the graphene coated metal nanoparticles and the carbon nanotubes in the polymer, the strength is improved and the functionality thereof may be controlled.

In another aspect of the present invention, a 3D molded article including a composite material of graphene coated metal nanoparticles at 1 wt % to 20 wt %, nanocarbons at 10 wt % or less, and a polymer resin at 70 wt % to 99 wt % is provided.

In another aspect of the present invention, a method for manufacturing an FDM-type 3D printer polymer filament including mixing graphene coated metal nanoparticles at 1 wt % to 20 wt %, nanocarbons at 10 wt % or less, and a biocompatibility polymer resin at 70 wt % to 99 wt % to form a mixture, and extruding and spinning the mixture to form a filament, is provided.

In another aspect of the present invention, a polymer composite material including graphene coated metal nanoparticles at 1 wt % to 20 wt % and a biocompatibility polymer resin at 70 wt % to 99 wt % is provided.

In another aspect of the present invention, a molded article including a polymer composite material of graphene coated metal nanoparticles at 1 wt % to 20 wt % and a biocompatibility polymer resin at 70 wt % to 99 wt % is provided.

The present invention is harmless to the human body and is environmentally friendly because the biocompatible and biodegradable polymeric resin is used as a main component. Also, by using the graphene coated metal nanoparticle and the carbon nanotube filler, a mixture with improved strength and dispersibility in the polymer resin may be manufactured.

Further, by using the high strength polymer filament manufactured by the present invention, it is possible to manufacture a variety of high performance products, and application to the value-added industry using the 3D printer may be realized.

DETAILED DESCRIPTION OF THE EMBODIMENTS

Figure 1A:
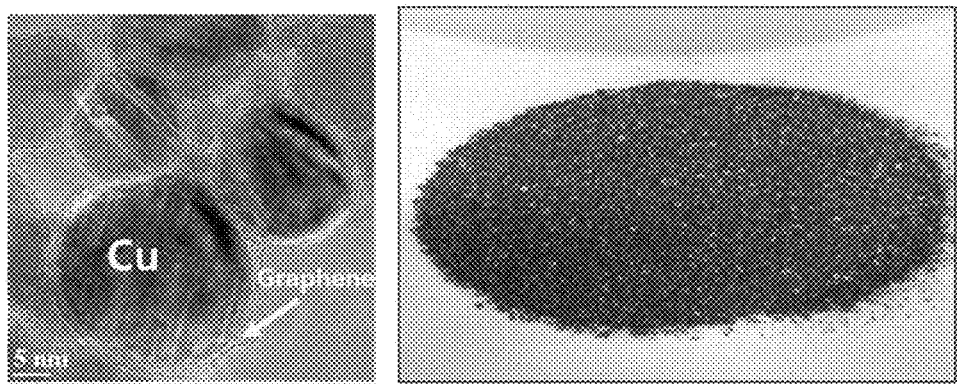
FIG. 1A is an electron microscopy image of graphene coated metal nanoparticles (left) used in Exemplary Embodiment 1 and a picture of a mixture (right) obtained by dispersing the metal nanoparticles and carbon nanotubes in a PLA resin.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

Throughout the present specification, unless explicitly described to the contrary, the word "comprise" and variations such as "comprises" or "comprising" will be understood to imply the inclusion of stated elements but not the exclusion of any other elements.

Throughout the present specification, "step-ing" or "step of" does not mean "step for".

Hereinafter, an exemplary embodiment will be described in detail, however the present invention is not limited thereto.

In an aspect of the present invention, a composite material including metal nanoparticles coated with graphenes at 1 wt % to 20 wt %, nanocarbons at 10 wt % or less, and a polymer resin at 70 wt % to 99 wt % is provided. The PLA that is widely used as the 3D printer polymer resin is a biocompatible and environmentally friendly material and is receiving the limelight in the next generation of the industry, however the use thereof is limited due to the tensile strength thereof. To overcome the limitation, the nanocarbon providing excellent characteristics such as charge mobility, high charge storage capacity, and mechanical flexibility may be used. The graphene coated metal nanoparticle that prevents oxidation and has 200 times the strength of steel and two times the thermal conductivity of diamond is used as the filler of the polymer resin along with the carbon nanotube as a strengthening material with a thermal resistance property and high thermal conductivity, thereby manufacturing the filament with improved strength and durability of the polymer resin.

In the exemplary embodiment of the present, the polymer resin may be a biocompatibility polymer, and may specifically include at least one selected from a group including polylactide [PLA], poly(methacrylate) [PMA], a poly(caprolactone-lactide) random copolymer [PCLA], poly(glycolide) [PGA], poly(di-dioxanone) [PDO], poly(DL-lactide-co-L-lactide) [LDLPLA], poly(DL-lactide-co-glycoside fluoride) [DLPLG], poly(glycolide-co-trimethylene carbonate) [PGA-TMC], poly(L-lactide-co-glycolide) [PLGA], poly(ϵ-caprolactone) [PCL], poly(glycolide-co-L-lactide) [PGLA], poly(glycolide-co-DL-lactide) [PGDLLA], poly-L-lactide [PLLA], poly-D-lactide [PDLA], poly-DL-lactide [PDLLA], poly(L-lactide-co-ϵ-caprolactone) [LCL], and combinations thereof. Among the biocompatible polymer resins, the general material used in the FDM-type printer is the PLA.

In addition, various types such as acrylonitrile butadiene styrene [ABS], nylon, poly(vinyl alcohol) [PVA], and impact-resistant polystyrene [HIPS] may be used, but the materials except for the PLA are not biocompatible or environmentally friendly, however they may be used.

In the exemplary embodiment of the present invention, the graphene coated metal nanoparticle may include at least one selected from a group including Cu, Al, Ti, Ni, W, Fe, Co, Zn, Si, Ag, Au, Pt, Pd, Cd, Ta, and combinations thereof, however it is not limited thereto. By coating the graphene on the metal nanoparticle, efficient electron transmission may be formed between the two materials through strong electric field reinforcement of an interface of the graphene coated metal nanoparticle, and the 3D printer polymer filament of the FDM type manufactured by the present invention may be expected to be applied in various fields requiring durability of the material.

In the exemplary embodiment of the present invention, a size of the graphene coated metal nanoparticle may be from 10 nm to 100 nm, however it is not limited thereto. The size of the graphene coated metal nanoparticle, for example, may be from 10 nm to 100 nm, from 20 nm to 100 nm, from 30 nm to 100 nm, from 40 nm to 100 nm, from 50 nm to 100 nm, from 60 nm to 100 nm, from 70 nm to 100 nm, from 80 nm to 100 nm, from 90 nm to 100 nm, from 10 nm to 90 nm, from 10 nm to 80 nm, from 10 nm to 70 nm, from 10 nm to 60 nm, from 10 nm to 50 nm, from 10 nm to 40 nm, from 10 nm to 30 nm, or from 10 nm to 20 nm, however it is not limited thereto.

In the exemplary embodiment of the present invention, the nanocarbon may include at least one selected from a group including fullerene, carbon nanotubes, graphene, and combinations thereof, however it is not limited thereto. The use of spherical fullerene, the tube-type carbon nanotube, and the thin-film type graphene is not limited, however it is advantageous to use the large specific surface area of the carbon nanotubes interconnected by a ratio of a length for a high diameter.

In the exemplary embodiment of the present invention, the composite material may have an average tensile strength of 80 MPa or more. The tensile strength of the PLA filament manufactured by the exemplary embodiment of the present invention is about 66.01 MPa, however the tensile strength is improved by about 30% to 83.87 MPa due the physical property resulting from the graphene coated metal nanoparticle and the carbon nanotube in the case of the filament made of the graphene coated Cu nanoparticle/the carbon nanotube/the PLA mixture.

In the exemplary embodiment of the present invention, the composite material is the FDM-type 3D printer polymer filament.

In another aspect of the present invention, a 3D molding material made of the composite material including the graphene coated metal nanoparticle at 1 wt % to 20 wt %, the nanocarbon at 10 wt % or less, and the biocompatibility polymer resin at 70 wt % to 99 wt % is provided. In detail, the 3D molding material made of the FDM-type 3D printer polymer filament is provided. The manufacturing of the molding material is not limited in fields such as construction, aerospace, electrics, electronics, and bios.

In another aspect of the present invention, a manufacturing method of the FDM-type 3D printer polymer filament including mixing the graphene coated metal nanoparticles at 1 wt % to 20 wt %, the nanocarbons at 10 wt % or less, and the biocompatibility polymer resin at 70 wt % to 99 wt % to form the mixture thereof and extruding and spinning the mixture to form the filament is provided. The polymer resin is extruded in a thin thread shape through an extruder and is cooled, and is stretched to improve the strength of the filament.

In another aspect of the present invention, the polymer composite material including the graphene coated metal nanoparticles at 1 wt % to 20 wt % and the biocompatibility polymer resin at 70 wt % to 99 wt % is provided. In the exemplary embodiment of the present invention, the composite material is the FDM-type 3D printer polymer filament.

In another aspect of the present invention, the molded article including the polymer composite material of the graphene coated metal nanoparticles at 1 wt % to 20 wt % and the biocompatibility polymer resin at 70 wt % to 99 wt % is provided.

Next, the exemplary embodiment and the manufacturing embodiment for explaining the present invention will be described in detail. However, the exemplary embodiment and the manufacturing embodiment according to the present invention may be changed into several different types, and the range of the present invention should not be construed as limited to the exemplary embodiment and manufacturing embodiment described below. The exemplary embodiment and the manufacturing embodiment of the present invention are provided in order to completely explain the present invention to a person of ordinary skill in the art.

Exemplary Embodiment 1: A Mixture of the Graphene Coated Cu Nanoparticles, the Carbon Nanotubes, and the PLA Manufacturing The graphene coated Cu nanoparticles (with a diameter of 100 nm or less) at 5 wt % to 20 wt %, the multi-walled carbon nanotubes (MWCNT) at 2 wt % or less with a diameter of 10 μm to 50 μm, and the PLA (polylactic acid) at 80 wt % to 90 wt % are provided and put into a mixer [Thinky Mixer], and then uniformly mixed for 30 s at 2000 rpm to manufacture the mixture of the graphene coated Cu nanoparticles, the carbon nanotubes, and the PLA.

For comparison, the PLA at 80 wt % to 90 wt % and the carbon nanotubes at 10 wt % to 20 wt % are mixed to form the mixture of the carbon nanotubes and the PLA, and 100 wt % of the PLA is also prepared.

Exemplary Embodiment 2: PLA Filament Manufacturing

The mixture of the graphene coated Cu nanoparticles, carbon nanotubes, and the PLA manufactured by Exemplary Embodiment 1 is supplied to the extruder through a hopper. The supplied mixture of the graphene coated Cu nanoparticles, the carbon nanotubes, and the PLA is melted and kneaded in the extruder and is spun through a spinning nozzle. In this case, a screw temperature of the extruder is from 180 to 200° C. The spun filament is cooled in air at a cooling part, and then the PLA filament that is stretched in a stretching roll is wound to a bobbin to manufacture the graphene coated Cu nanoparticle/carbon nanotube/PLA filament.

Also, by using the mixture of the carbon nanotubes and the PLA, and the PLA manufactured with the same method as Exemplary Embodiment 1, the carbon nanotube/PLA filament, and the PLA filament are respectively manufactured.

The diameter of the manufactured PLA filament is an average of 1.75 mm, and a thickness may be controlled depending on the nozzle diameter of the used printer.

Manufacturing Example: Specimen (Dog-Bone Type) Manufacturing by Using a 3D Printer The graphene coated Cu nanoparticle/carbon nanotube/PLA filament manufactured by Exemplary Embodiment 2 is provided to the FDM-type 3D printer to manufacture the dog-bone-type specimen. The graphene coated Cu nanoparticle/the carbon nanotube/PLA filament is extruded in the FDM-type 3D printer and is melted in an available temperature of 200 to 220° C., and is deposited through the nozzle with a speed from 60 mm/s to 80 mm/s to be output, thereby being molded into the desired specimen (dog-bone type).

The PLA filament manufactured by Exemplary Embodiment 2 is used to manufacture the specimen by the same method. A detailed output condition when manufacturing the specimen is shown in Table 1 below.

TABLE 1

| Output conditions | Values |
| --- | --- |
| Layer height (mm) | 0.1-0.2 |
| Output speed (mm/s) | 60-80 |
| Nozzle temperature (° C.) | 200-220 |
| Bed temperature (° C.) | 50-70 |

Figure 1B:
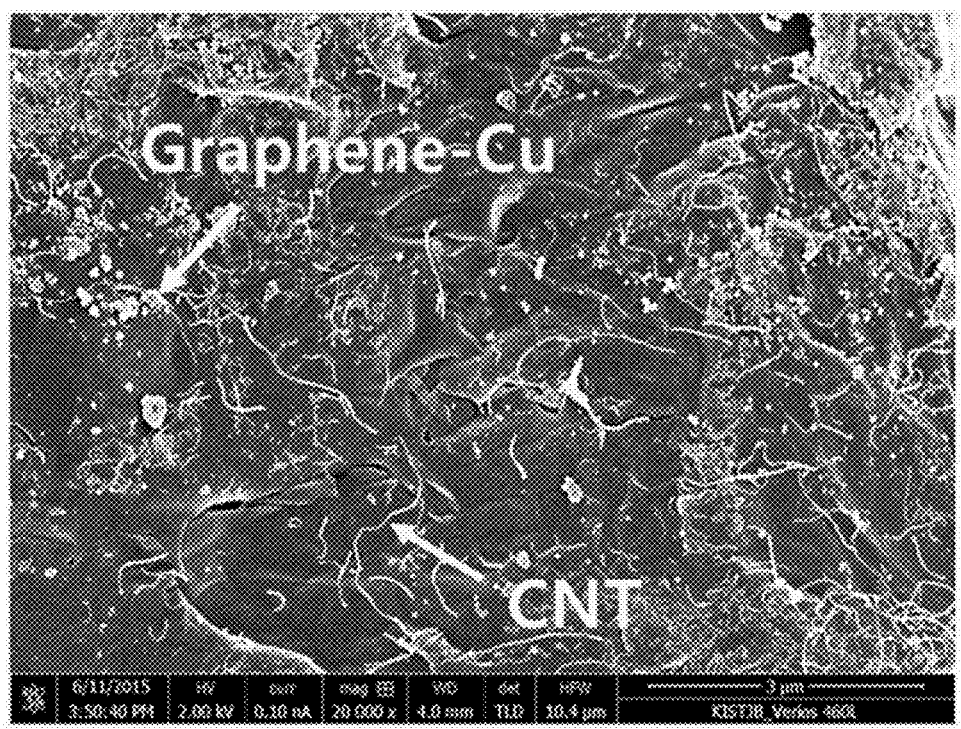
FIG. 1B is a scanning electron microscopy (SEM) image of the mixture (in the view, Graphene-Cu represents a Cu nanoparticle coated with the graphene and CNT represents the carbon nanotube).

The mixture of the graphene coated Cu nanoparticles, the carbon nanotubes and the PLA manufactured by Exemplary Embodiment 1 is represented in FIG. 1A and FIG. 1B, and it may be confirmed that the graphene coated Cu nanoparticles and the carbon nanotubes used as the filler are uniformly dispersed in the PLA as a observation result through a scanning electron microscopy (SEM). To maintain uniform strength of the PLA filament, a process of manufacturing the mixture powder that is uniformly dispersed plays an important role. It is clearly confirmed that the graphene coated Cu nanoparticles and the linear carbon nanotubes are uniformly dispersed through FIG. 1B.

Figure 2:
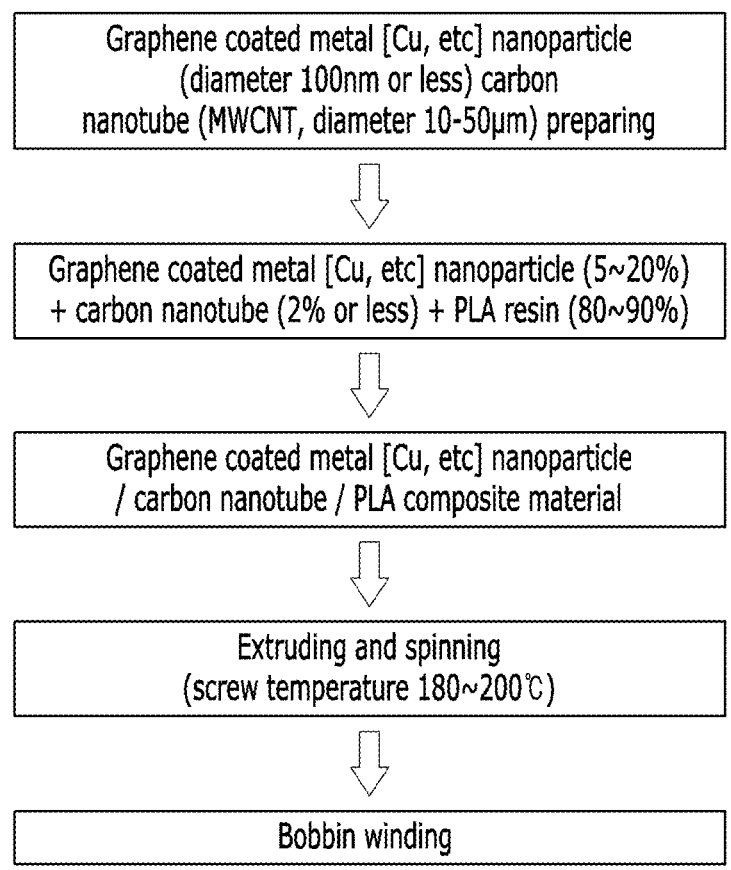
FIG. 2 is a manufacturing process view of a graphene coated Cu nanoparticle/carbon nanotube/PLA filament according to Exemplary Embodiment 1 and Exemplary Embodiment 2.
Figure 3A:
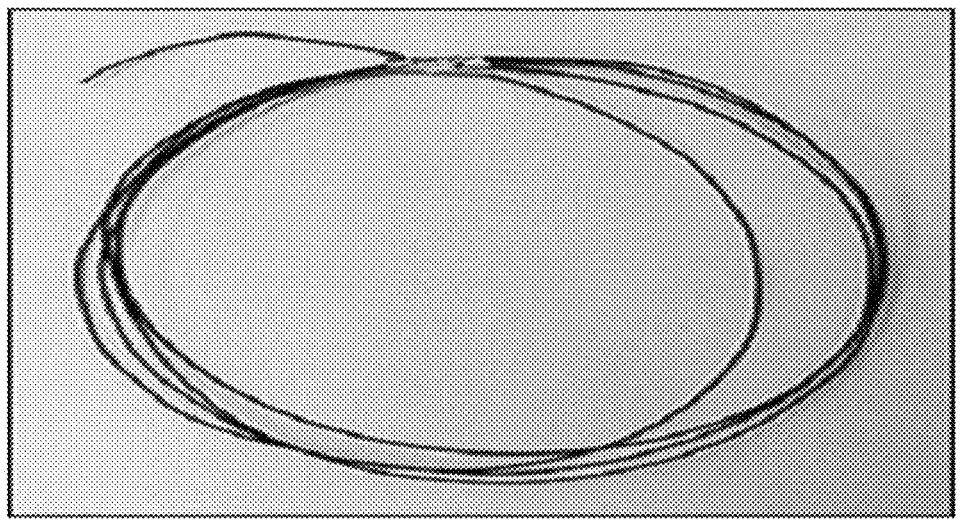
FIG. 3A is a view showing a graphene coated Cu nanoparticle/carbon nanotube/PLA filament manufactured by Exemplary Embodiment 1 and Exemplary Embodiment 2.
Figure 3B:
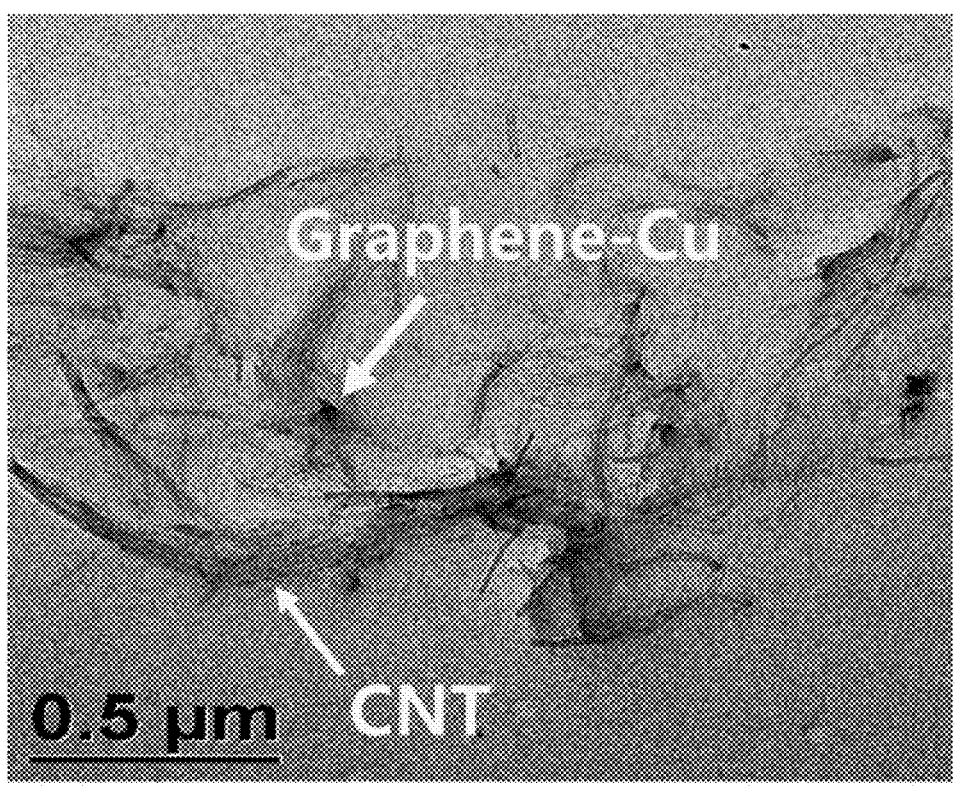
FIG. 3B is a view of a transmission electron microscope (TEM) image for observing a filler dispersed in a PLA filament as a fine structure of a graphene coated Cu nanoparticle/a carbon nanotube/a PLA filament.

FIG. 2 is a manufacturing process view of a graphene coated Cu nanoparticle/carbon nanotube/PLA filament according to Exemplary Embodiment 1 and Exemplary Embodiment 2. FIG. 3A is an image for observing the graphene coated Cu nanoparticle/the carbon nanotube/the PLA filament manufactured by the manufacturing process, and it may be confirmed that the graphene coated Cu nanoparticles and the carbon nanotubes exist in the graphene coated Cu nanoparticle/carbon nanotube/PLA filament that is melted and extruded-spun through FIG. 3B.

Figure 4:
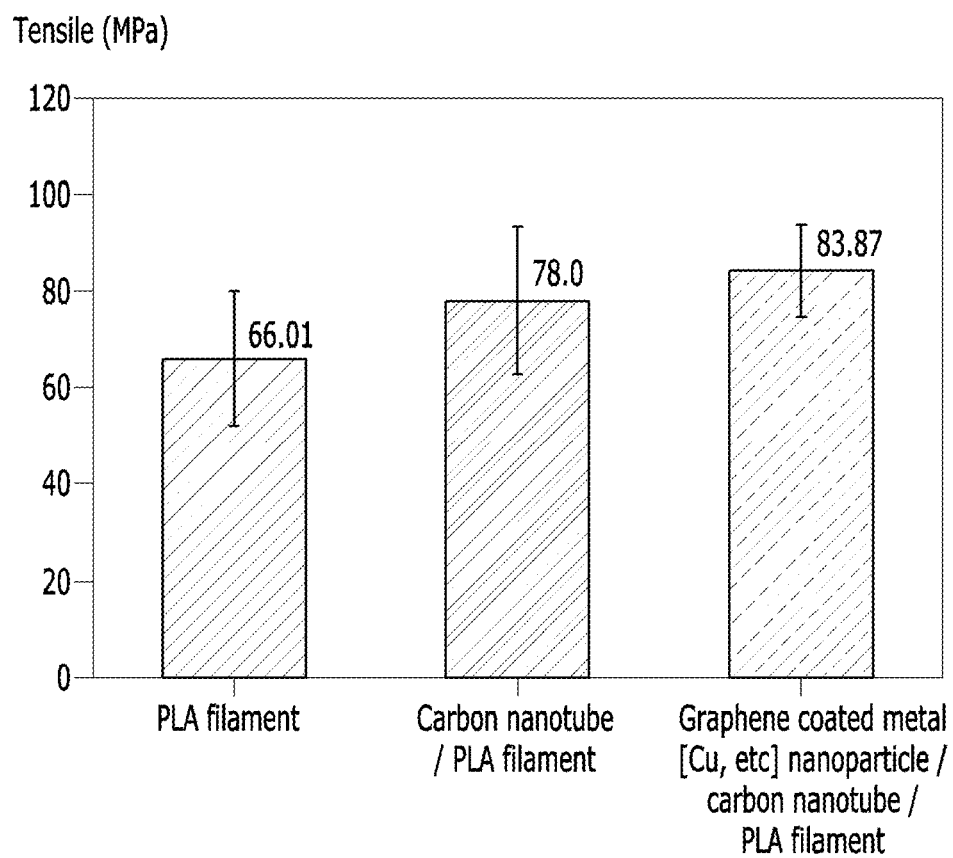
FIG. 4 is a graph comparing tension strength of a graphene coated Cu nanoparticle/carbon nanotube/PLA filament, a PLA filament, and a carbon nanotube/PLA filament manufactured by Exemplary Embodiment 2.
Figure 5:
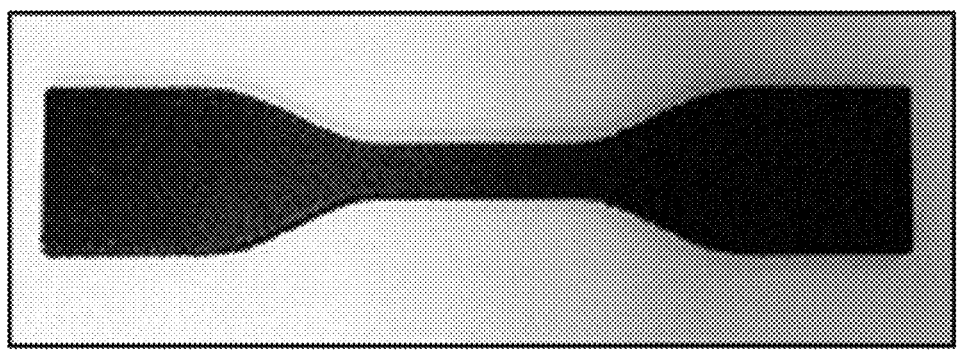
FIG. 5 is a view showing a specimen (a dog-bone type) image manufactured by a manufacturing exemplary embodiment.
Figure 6:
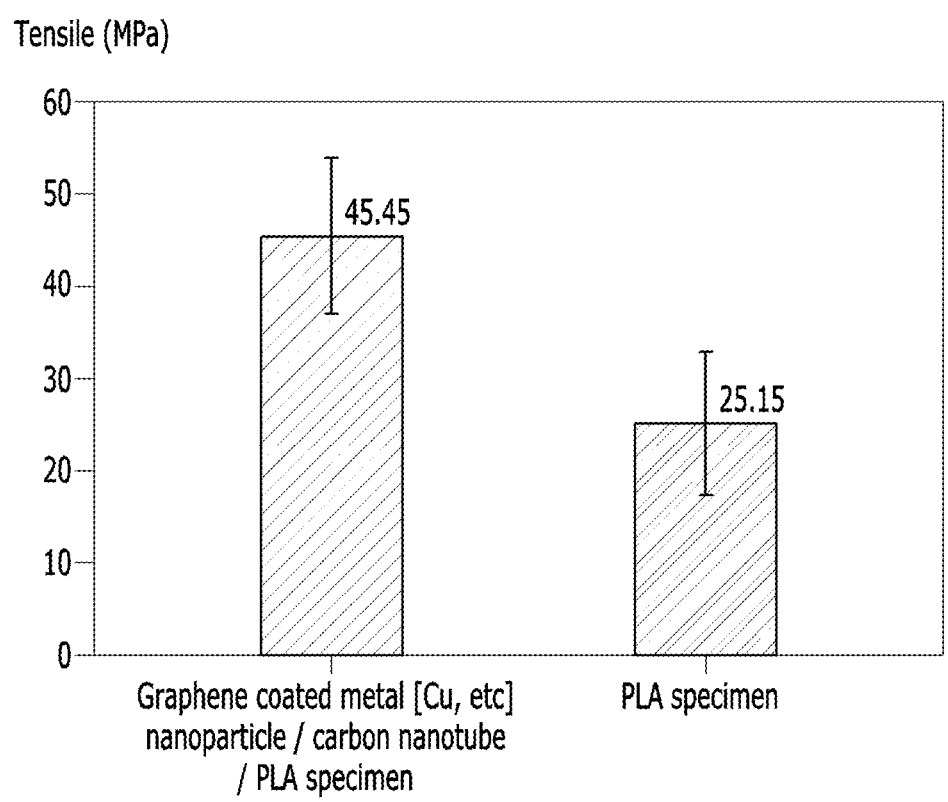
FIG. 6 is a graph for comparing tensile strength of a specimen (a dog-bone type) image manufactured by a manufacturing exemplary embodiment.

FIG. 4 is a graph comparing the average tension strength of the graphene coated Cu nanoparticle/carbon nanotube/PLA filament and the average tension strength of the PLA filament manufactured by Exemplary Embodiment 2, where the average tensile strength of the PLA filament is 66.01 MPa, and the average tensile strength of the graphene coated Cu nanoparticle/carbon nanotube/PLA filament manufactured by the present invention is largely improved by about 30% to 83.37 MPa. FIG. 5 is an image of the specimen of the graphene coated Cu nanoparticle/carbon nanotube/PLA filament manufactured by Exemplary Embodiment 2 through the 3D printing, and the specimen (dog-bone type) is manufactured through the manufacturing embodiment to observe the image. FIG. 6 is a graph comparing a tensile strength of a specimen (a dog-bone type) image manufactured by a manufacturing exemplary embodiment, and it is confirmed that the tensile strength is increased by about 80% or more compared with the PLA specimen after the 3D printing. Accordingly, the 3D molded article with improved strength and durability may be manufactured and the width application thereof may be expected in various product groups such as the biotechnology field as well as kitchen and household containers and toys through the included metal particles such as Cu.

What is claimed is:

1. A composite material comprising graphene coated metal nanoparticles at 1 wt % to 20 wt %, nanocarbons at 10 wt % or less, and a polymer resin at 70 wt % to 99 wt %,
   wherein an average tensile strength of the composite material is 80 MPa or more, and
   wherein the composite material is a Fused Deposition Modeling (FDM)-type 3D printer polymer filament.

2. The composite material of claim 1, wherein the polymer resin comprises at least one selected from a group consisting of polylactide [PLA], polymethacrylic acid [PMA], a poly(caprolactone-lactide) random copolymer [PCLA], poly(glycolide) [PGA], poly(dioxanone) [PDO], poly(DL-lactide-co-L-lactide) [LDLPLA], poly(DL-lactide-co-glycolide) [DLPLG], poly(glycolide-co-trimethylene carbonate) [PGA-TMC], poly(L-lactide-co-glycolide) [PLGA], poly(ε-caprolactone) [PCL], poly(glycolide-co-L-lactide) [PGLA], poly(glycolide-co-DL-lactide) [PGDLLA], poly-L-lactide [PLLA], poly-D-lactide [PDLA], poly-DL-lactide [PDLLA], poly(L-lactide-co-ε-caprolactone) [LCL], acrylonitrile butadiene styrene [ABS], nylon, polyvinyl alcohol [PVA], impact-resistant polystyrene [HIPS], and combinations thereof.

3. The composite material of claim 1, wherein the graphene coated metal nanoparticles comprise at least one selected from a group consisting of Cu, Al, Ti, Ni, W, Fe, Co, Zn, Si, Ag, Au, Pt, Pd, Cd, Ta, and combinations thereof.

4. The composite material of claim 1, wherein the nanocarbons comprise at least one selected from a group consisting of fullerene, carbon nanotube, graphene, and combination thereof.

5. A molding article comprising the composite material of claim 1.

6. A method for manufacturing a fused deposition modeling (FDM)-type 3D printer polymer filament, comprising:
   mixing graphene coated metal nanoparticles at 1 wt % to 20 wt %, nanocarbons at 10 wt % or less, and a biocompatible polymer resin at 70 wt % to 99 wt % to form a mixture; and
   extruding and spinning the mixture to form the FDM-type 3D printer polymer filament,
   wherein an average tensile strength of the FDM-type 3D printer polymer filament is 80 MPa or more.

7. A molding article comprising the composite material of claim 1.

8. A molding article comprising the composite material of claim 1.

* * * * *